Dec. 21, 1954
B. H. BARNES ET AL
2,697,240
PIPE WIPER
Filed Oct. 11, 1946
FIG. 1.
FIG. 2.
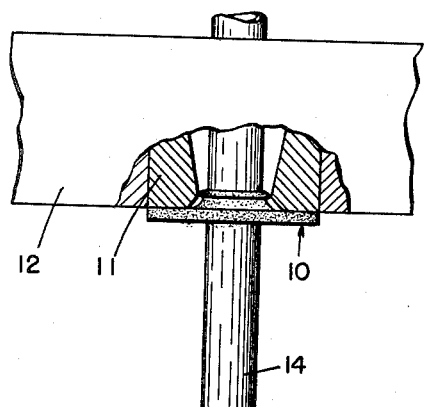
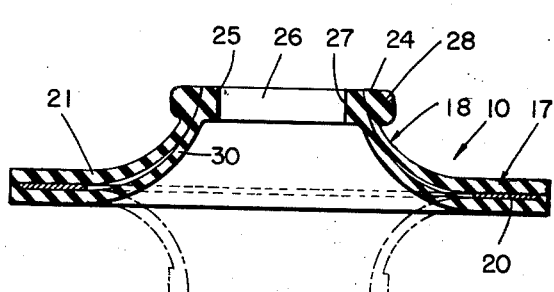
FIG. 3.
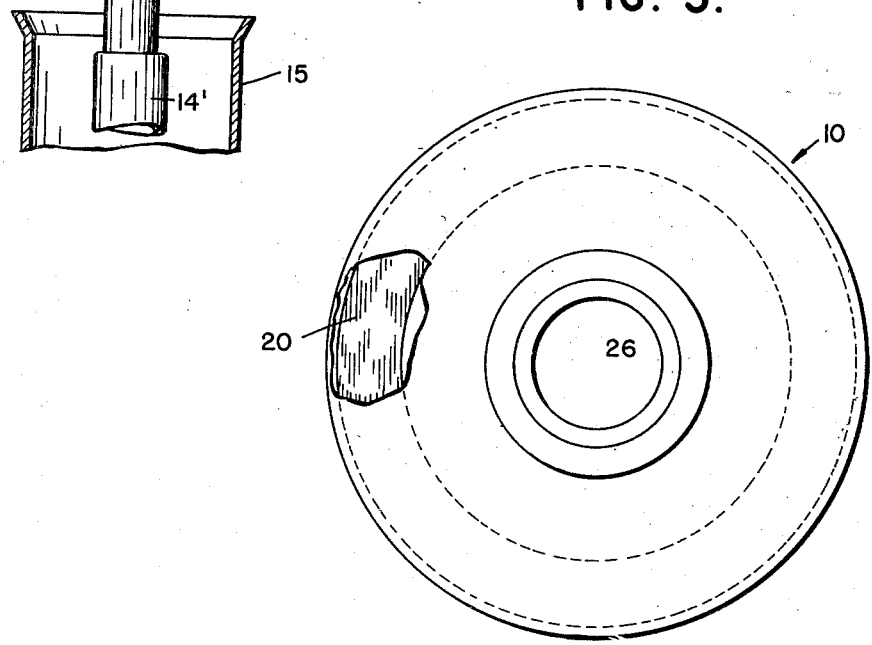
INVENTORS
BYRON H. BARNES AND
BURT S. MINOR
BY
*Marcus & Graham*
ATTORNEYS

United States Patent Office 2,697,240
Patented Dec. 21, 1954

2,697,240
PIPE WIPER

Byron H. Barnes, San Marino, and Burt S. Minor, Whittier, Calif.

Application October 11, 1946, Serial No. 702,836

2 Claims. (Cl. 15—210)

This invention relates generally to devices for use in removing rotary mud or drilling fluid from drill pipe or oil from tubing as the same are removed from the well, commonly referred to as pipe wipers.

Formerly it was the practice to play a stream of water on the drill pipe as it was withdrawn from the well in order to remove the drilling fluid therefrom. However, this practice is objectionable because the water dilutes the drilling fluid, lowering its specific gravity, and because it creates a hazardous condition by wetting the floor of the derrick. As a result in recent years it has become the practice to utilize a wiper member for removing the fluid from the pipe and several types of such wipers are currently in use. The types with which we are familiar are not entirely satisfactory, one objection to them being that as the tool joints or couplings on the pipe are pulled through the wiper, the wiper slaps back onto the main section of the pipe, splashing mud or fluid upwardly onto the workmen or onto the derrick floor. Since the wipers must necessarily be made of a resilient or elastic material such as rubber or rubber composition, another serious objection is the fact that irregularities and sharp projections on the pipe often cut or split the wiper when it is under tension or in a stretched condition as a tool joint or other enlargement of the pipe passes through it.

It therefore is a primary object of this invention to provide a simple, novel, improved wiper which will efficiently remove the fluid from the pipe as it is withdrawn from the well and which does not have the above-noted disadvantages.

It is also an object of the invention to provide a device of the type indicated which is durable and possesses long-wearing qualities. In this connection, it is a particular object of the invention to provide a wiper which is designed to minimize as far as possible the tendency of the device to split or be cut on its inner surface by the action of the pipe being drawn therethrough. It is also an object to provide a construction in a wiper which limits the spreading of any splits or cuts occurring on the inner surface of the wiper.

It is a further object of the invention to provide a wiper device which is shaped to achieve an efficient wiping of the pipe and yet will freely pass the tool joints and other projections on the pipe and will pass these projections without causing splattering or splashing of the fluid as the wiper returns to the normal shape and size after the projection has passed through the wiper.

These and other objects will be apparent from the drawings and the following description thereof. Referring to the drawings, which are for illustrative purposes only:

Fig. 1 is a sectional elevation showing a wiping device embodying the invention with relation to the pipe, a rotary table and the water string or outer string of well casing;

Fig. 2 is a sectional elevation of the wiper shown in Fig. 1; and

Fig. 3 is a plan view of the wiper partly broken away to show the reinforcement member therein.

More particularly describing the invention, reference numeral 10 generally indicates a wiper embodying the invention which is shown in Fig. 1 positioned immediately below the slips 11 of the ordinary rotary drilling table 12. This is the normal position that the wiper would occupy as the pipe, indicated by the numeral 14, is withdrawn from the well, the outer casing of which is shown at 15.

The wiper member itself comprises a body which has a flat outer section 17 and an axially curved inner section 18. In the form shown the wiper is annular in shape although the outer surface need not be circular as shown. The wiper includes an annular reinforcing member 20 which may be a flat metal plate of steel or other metal, or it may be a plate of hard rubber or some other relatively stiff material.

The member 20 is cemented or vulcanized in place. It is a particular feature of the invention that the inner section 18 of the wiper have an inner pipe-wiping portion in compression and an outer hoop tension portion therearound. Thus, I prefer to mold the body of the wiper, which may be of rubber, synthetic rubber, or other suitable resilient material, with the outer portion, designated 21, in the position shown in Fig. 2, and with the inner portion, designated 30, turned away from the outer portion as shown by the broken lines of Fig. 2. The inner portion is subsequently turned inside-out into the outer portion with the result that the inner surface of portion 30 is placed in compression and is not readily subject to being cut when in normal use.

The inner portion 30 terminates at its inner end in a pipe wiping lip 25 which defines an opening 26 for the reception of the pipe 14. This lip is characterized by a straight or cylindrical wall 27 defining the opening 26. The outer portion 21 is preferably formed with an outwardly extending bead 28 at its inner end in order to provide added strength in this region.

With the construction outlined, the opening 26 through the wiper is substantially the same diameter as the external diameter of the pipe 14 to be wiped so that the lip 25 performs the wiping action as the pipe is drawn through the wiper. By reason of the curved upwardly extending inner section of the wiper, this section of the wiper readily expands to pass projections on the pipe such as the tool joints, one of which is shown at 14′ (Fig. 1).

By reason of the fact that the inner section of the wiper is comprised of two parts 21 and 30 and is parted or divided therebetween, should any sharp projections on the pipe cut the inner member 30 the wiper will not be cut or split radially entirely therethrough and rendered unsuitable for use. Any cut would be prevented by the line of parting from spreading outwardly, leaving the member 21 undamaged and resiliently supporting the inner section.

It will be apparent from the above that the outer portion 21 of the inner section of the wiper forms a hoop tension member around the inner portion 30 of the inner section so that the inner portion will be effectively supported even in the event of its being cut. Also, since the inner surface of the inner portion is in compression it is not readily subject to being cut by the pipe as the same is pulled through the wiper.

While a flat annular reinforcing member embedded in the body of the wiper has been described and shown, it is contemplated that other means may be employed for stiffening the outer section of the wiper. For example, an external plate might be used, or the rubber composition itself might be sufficiently hardened in the region of the outer section to eliminate the necessity of an additional reinforcing member. Fibers such as cotton linters or the like might be used as a reinforcement means.

In operation, the wiper is installed on a pipe below an abutment such as the rotary table shown in Fig. 1, and as the pipe is pulled upwardly through it, the pipe engaging wiping lip serves to remove fluid from the pipe. When a tool joint or other projection is drawn through the wiper, the upturned inner section readily expands to permit passage of the tool joint or other projection on the pipe and, as the inner section returns to normal size, it has been found that the shape of the pipe wiping lip, indicated by numeral 25 in Fig. 2, is such that there is no splashing of the mud or other fluid upwardly.

If the pipe should be run into the well with the wiper in place on it, the wiper 10 would normally be supported against being carried into the well on the pipe by some means (not shown) against which it might abut. When the wiper engages such means the downward motion of the pipe therethrough would turn the wiper partially inside-out so that the inner section thereof would be turned downwardly to readily permit passage of the pipe and enlargements thereon. Once the direction of the pipe was reversed and drawn upwardly through the wiper the inner section of the wiper would return to its normal position.

Although the invention has been shown and described with reference to particular embodiments thereof, it is contemplated that various modifications and changes can be made without departing from the scope of the invention as set forth in the accompanying claims.

We claim:

1. A pipe wiper comprising an annular elastic body having an annular, flat outer section and a curved, axially projecting inner section, said inner section comprising an inner pipe-engaging portion and an outer reinforcing portion surrounding and in contact with said inner pipe-engaging portion, said inner pipe-engaging portion projecting axially in a direction opposite to its normal formed position whereby the inner surface portion thereof is in compression.

2. An annular pipe wiper comprising a body of elastic material having a flat outer section and an axially projecting inner section defining a pipe-receiving opening, said inner section being parted concentrically of the section between the inner and outer surfaces thereof forming an inner pipe-wiping portion and an outer hoop tension portion, said outer portion being continuous and uninterrupted, the inner surface of said inner pipe-wiping portion being under compression.

References Cited in the file of this patent

UNITED STATES PATENTS

| Number | Name | Date |
|---|---|---|
| 696,183 | McAuliffe | Mar. 25, 1902 |
| 1,605,577 | Bruen | Nov. 2, 1926 |
| 1,800,578 | Webb | Apr. 14, 1931 |
| 2,162,104 | Mosher | June 13, 1939 |
| 2,272,395 | Ballagh | Feb. 10, 1942 |
| 2,290,507 | Thompson | July 21, 1942 |
| 2,392,146 | Hall | Jan. 1, 1946 |
| 2,424,567 | Hill | July 29, 1947 |
| 2,444,653 | Kennedy et al. | July 6, 1948 |
| 2,476,324 | Reich | July 19, 1949 |

FOREIGN PATENTS

| Number | Country | Date |
|---|---|---|
| 492,954 | Great Britain | Sept. 29, 1938 |